(12) United States Patent
Nydegger

(10) Patent No.: US 11,619,202 B1
(45) Date of Patent: Apr. 4, 2023

(54) CONTROL SYSTEM FOR AN ELECTRIC GENERATOR

(71) Applicant: Gravitas E2P Inc., Rancho Santa Fe, CA (US)

(72) Inventor: Neil K. Nydegger, Rancho Santa Fe, CA (US)

(73) Assignee: Gravitas E2P inc., Rancho Santa Fe, CA (US)

( * ) Notice: Subject to any disclaimer, the term of this patent is extended or adjusted under 35 U.S.C. 154(b) by 0 days.

(21) Appl. No.: 17/690,166

(22) Filed: Mar. 9, 2022

(51) Int. Cl.
*F03B 13/00* (2006.01)
*H02K 7/18* (2006.01)

(52) U.S. Cl.
CPC ............ *F03B 13/00* (2013.01); *H02K 7/1884* (2013.01); *F05B 2220/707* (2013.01); *F05B 2270/301* (2013.01)

(58) Field of Classification Search
CPC . F03B 13/00; H02K 7/1884; F05B 2220/707; F05B 2270/301
See application file for complete search history.

(56) References Cited

U.S. PATENT DOCUMENTS

2019/0249643 A1\* 8/2019 Townsend, IV ........ F03B 17/04

\* cited by examiner

*Primary Examiner* — Viet P Nguyen

(57) ABSTRACT

The present invention pertains to systems and methods for controlling machines that generate electricity using a source of renewable energy, namely gravity. In overview, an electro-magnetic subsystem of the machine harvests the kinetic energy of a buoyant shuttle as it falls through air and into a bi-level tank. The shuttle is then arrested in the bi-level water tank and returned, by virtue of the shuttle's buoyancy, to its start point for a subsequent duty cycle. The return of the shuttle is made possible by a hydro-pneumatic subsystem of the machine that overcomes the potential energy needed to raise and lower the upper water level in the bi-level tank to compensate for a transit of the shuttle through the tank. The hydro-pneumatic subsystem does this by cyclically maintaining the required difference in water levels in the bi-level tank.

20 Claims, 3 Drawing Sheets

CONTROL SYSTEM FOR AN ELECTRIC GENERATOR

FIELD OF THE INVENTION

The present invention pertains to systems for controlling electric generators. More particularly, the present invention pertains to the control of power plants that use electric generators, which are operated by machines that are driven by a source of renewable energy, namely gravity. The present invention is particularly, but not exclusively, useful for harvesting the kinetic energy of a falling object and then hydrodynamically overcoming the potential energy needed to return the object to its start point for a subsequent duty cycle.

BACKGROUND OF THE INVENTION

In physics, work and energy are equivalent to each other because both are derived from the basic notion of a force acting on an object through a distance. Power, however, is the time rate of doing work. Consequently, there are two considerations for work/energy that depend on the static or dynamic context of the object on which a force is acting. One is known as potential energy (PE) which is a static consideration that depends only on the position of an object relative to another position. PE is therefore not time dependent. The other type of energy is known as kinetic energy (KE), which is a dynamic consideration that depends on the velocity of an object as it moves between two positions.

In the context of the present invention which operates with a bi-level tank of water, the earth's gravitational field provides for an alternating combination of the motive forces gravity and buoyancy. For the present invention both PE and KE considerations are required. For one, as a shuttle falls through air under the force of gravity and into a bi-level water tank its KE is converted into an electric output for the power plant. The shuttle then returns by buoyancy to the start point. On the other hand, the input work required to run the power plant is accomplished by a displacement device that maintains appropriate water levels in a bi-level water tank as the shuttle returns through the water tank to its start point.

The input work required from the displacement device to run the power plant is equal to the PE needed to raise a shuttle volume equivalent of water in the tank through a predetermined vertical distance. In operation, the result is that the manipulation of water levels will allow the shuttle to rise in the bi-level tank under the influence of buoyancy with a subsequent reset of the water levels for the next shuttle. Both the shuttle and the displacement device, however, interact with the bi-level water tank independently of each other. Thus, an operation of the power plant needs to be controlled.

Considering the above, it is an object of the present invention to control both a shuttle's engagement with an electric generator and the shuttle's return to a start point for another cycle, and to thereby coordinate a multi-shuttle operation of a power plant. Another object of the present invention is to monitor the velocity of each shuttle in a multi-shuttle operation to maintain a proper separation distance between shuttles for a coordinated multi-shuttle operation. Yet another object of the present invention is to provide a power plant that uses the forces of gravity and buoyancy, acting respectively on a plurality of individual shuttles, to generate electricity, wherein the power plant is easy to construct, is simple to use, and is comparatively cost effective.

SUMMARY OF THE INVENTION

For continuity, the construction and use of a power plant as contemplated for the present invention remains essentially as disclosed in U.S. Pat. No. 11,268,487, U.S. patent application Ser. No. 17/537,953, and U.S. patent application Ser. No. 17/527,959 which are all assigned to the same assignee as the present invention, and which are incorporated herein by reference.

In accordance with the present invention, the operational control of a power plant is dictated by considerations of work/energy, together with applicable output power requirements. Specifically, there is a need for the power plant's electric output power to exceed the work input required to run the power plant. From an operational perspective, the present invention takes advantage of the fact that the input work requirement for operating a power plant machine is properly considered in the context of an equivalent potential energy PE requirement. As noted above, the input work requirement for the power plant machine is based solely on the need to lift the weight of a predetermined volume of water though a predetermined vertical distance. Thus, the input work is a time-independent consideration that remains constant within the constraint that the input work must be completed within the shuttle's operational output power cycle.

Structurally, a control system for operating a power plant in accordance with the present invention includes a plurality of motion (velocity) sensors that are respectively mounted at predetermined locations along a vertically oriented closed-loop pathway. This pathway is defined by a bi-level tank which has an upper water surface level and a lower water surface level. The motion sensors are located on the closed loop pathway both inside and outside the bi-level tank for the sole purpose of tracking a shuttle as it travels along the pathway.

Operationally, shuttle movements along the closed loop pathway are made possible by the actions of two separately operated valve systems in two different subsystems of the power plant. These subsystems cooperate with each other via their respective interaction with the bi-level tank. A first valve system in an electro-magnetic subsystem of the power plant is mounted on the bi-level tank for maintaining the upper water surface level above the lower water surface level. A second valve system of a hydro-pneumatic subsystem is provided for controlling the operation of a piston plate that is submerged in the bi-level tank. The piston plate is activated to reciprocally displace a predetermined volume of water up and down through a predetermined distance along a waterway portion of the closed-loop pathway in the bi-level tank. Specifically, this is done by maintaining the different water surface levels in the bi-level tank to compensate for the transit of the buoyant shuttle as it travels along the waterway portion of the closed-loop pathway.

Structurally, the closed-loop pathway has an airway portion outside the bi-level tank and a waterway portion that is inside the bi-level tank. A control unit is connected respectively with the plurality of sensors, with the first valve system, and with the second valve system to maintain control for each shuttle as it transits along the closed-loop pathway. More particularly, this control becomes crucial when the power plant simultaneously operates with a plurality of shuttles.

For control purposes, the closed loop pathway is sectioned into an "n" number of consecutive time zones aligned along the pathway. Specifically, "n" will also equal the number of shuttles being used for a combined multi-shuttle machine. Thus, as a control consideration, the up and down movement of water along the waterway in the bi-level tank needs to be carefully coordinated with the entry of each shuttle onto the waterway portion of the bi-level tank, and its exit from the waterway. For the present invention this coordination is accomplished by following each shuttle within its respective time zone.

Although each time zone has a same time duration, the physical lengths of the time zones will differ due to changes in the shuttle velocity(ies) required for the specific time zone in which the shuttle is travelling. Of critical importance here is the time duration a shuttle is engaged with the linear generator. This engagement time is a crucial design feature of the present invention as it determines the net output power of the machine. The importance of the engagement time is further underscored by the design feature that all time zones will be determined to have this same time duration.

An important design feature of the present invention involves the time interval required when the shuttle disengages from the linear generator and thereafter completes its transit of the lower tank for transit into the tower tank. Specifically, this transit time must be less than the shuttle's engagement time with the linear generator so the lower tank will be clear for receipt of the next sequential shuttle. In detail, after diving into the bi-level tank, the shuttle will decelerate to a zero velocity. It must then accelerate under the influence of its buoyancy from zero velocity at the bottom of the lower transfer tank to its underwater terminal velocity in the upper tower tank. Thus, all of this must occur within the same time zone. The terminal velocity will then be maintained until the shuttle breaches from the bi-level tank and onto its start point for the next cycle.

For a multi-shuttle operation another important control consideration involves establishing a predetermined start time for each shuttle's travel on the closed-loop pathway. Recall, time zones aligned along the closed-loop pathway must each have a same time duration. Collectively, these time zones establish a shuttle circuit whereon each shuttle has a predetermined circuit start time that precisely precedes the circuit start time of the immediately following shuttle. For purposes of the present invention, the circuit start time is set as the time a shuttle engages with the linear generator.

Finally, another important control feature of the shuttle circuit is that the last time zone must end as the first time zone begins. This is needed to maintain a collective continuity for then number of time zones. For the present invention, this continuity is accomplished by including a so-called stay (reset) time, $t_s$, which can be adjusted during the last time zone to ensure a proper start time for the shuttle. Thus, the last time zone will be ± variable, at least to some extent.

In detail, the last time zone of a shuttle circuit begins with a breaching time segment while the shuttle is still rising in the tower of the bi-level tank at its terminal velocity. The shuttle then breaches and comes to rest on a launch pad where its velocity is zero. While the shuttle is at rest on the launch pad, the stay time $t_s$ can be added or subtracted by the control unit to the time zone. This ± adjustment will be made prior to launch, while shuttle remains at zero velocity until it is released. Specifically, the shuttle will be released by the control unit with a free fall time remaining in the last time zone that will allow the shuttle to accelerate from v=0 to the velocity required for shuttle engagement with the linear generator.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

In the description of the preferred embodiments the notations set forth below are frequently used to help clarify the text. At the outset, it is to be appreciated that the control of a machine in accordance with the present invention is primarily a matter of timing. Accordingly, velocities and changes in the velocities for moving components of the machine, and the need for coordinating these velocities with changes in machine configurations are crucial for control purposes. Accordingly, the following notations are provided for reference purposes with the disclosure of the present invention.

Notations $t_f$ is the fall time needed for accelerating a shuttle from zero velocity at launch to a constant velocity $v_e$;

$t_e$ is the time duration of shuttle engagement with a linear generator at the constant velocity $v_e$;

$t_{dc}$ is the time for shuttle deceleration to zero velocity in the lower tank;

$t_{ac}$ is shuttle acceleration from zero velocity in the lower transfer tank to a terminal velocity $v_t$ in the upper tower tank;

$t_r$ is shuttle rise in the upper tower tank at the constant terminal velocity $v_t$;

$t_b$ is a time immediately before the shuttle breaches from the upper tower tank; and $t_s$ is a stay time (i.e. reset) for coordinating the next sequential shuttle launch.

Figure 1:
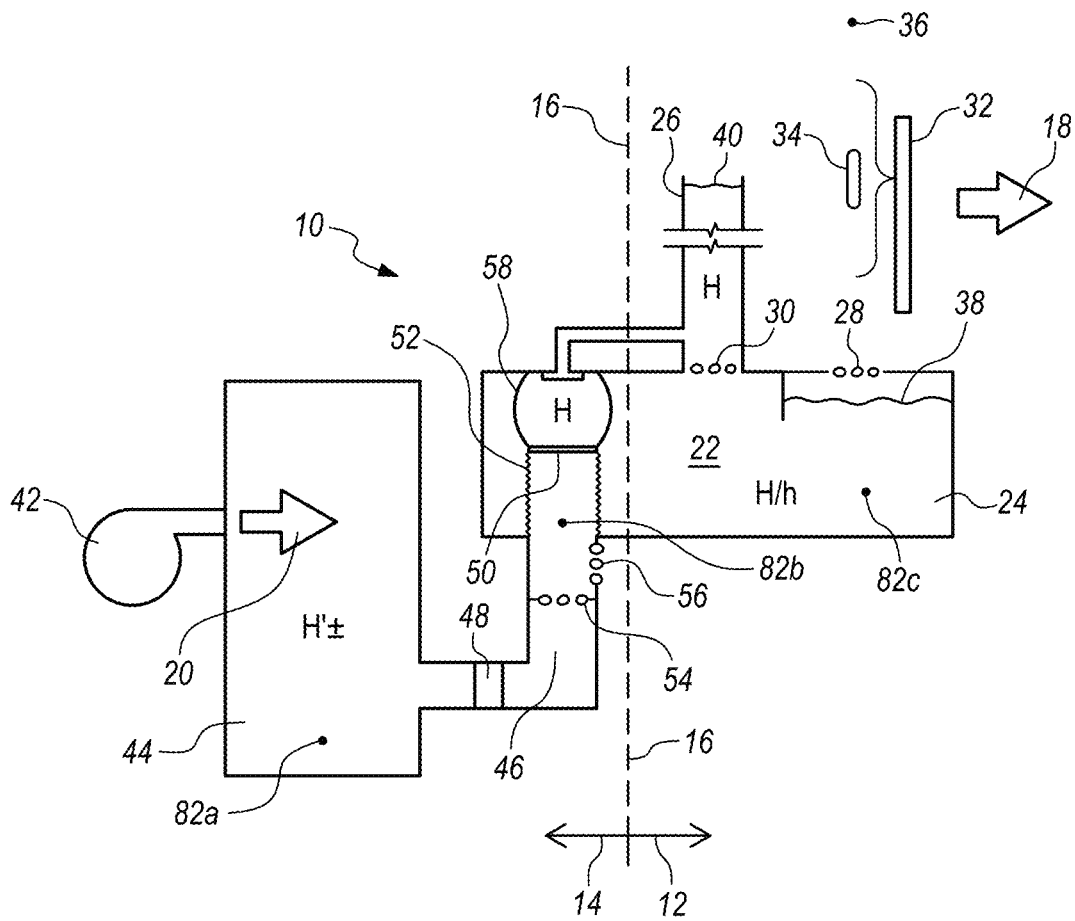
FIG. 1 is a schematic drawing of the machine showing the demarcation line between an electro-magnetic subsystem of the machine and a hydro-pneumatic subsystem of the machine.

With reference to FIG. 1 a power plant for generating electricity in accordance with the present invention is shown and is generally designated 10. As shown, the power plant 10 (sometimes hereinafter referred to as the machine 10) includes two subsystems. One is an electro-magnetic sub-system 12 and the other is a hydro-pneumatic subsystem 14. A demarcation line in FIG. 1 shows how the machine 10 is functionally divided into the subsystems 12/14. As intended for the present invention, output power 18 from the power plant (machine) 10 is generated by the electro-magnetic sub-system 12. On the other hand, the input work 20 that is required to drive the machine 10 is provided by the hydro-pneumatic subsystem 14.

A functional separation between the subsystems 12/14 is identified by the demarcation line 16 which shows that both subsystems 12/14 cooperate with each other via water in a bi-level tank which is generally designated 22. As shown, the bi-level tank 22 includes a lower transfer tank 24 and an upper tower tank 26. An access valve 28 is provided for selective access into the lower transfer tank 24, and a transfer valve 30 is provided to close and thereby isolate the upper tower tank 26 from the lower transfer tank 24 when the access valve 28 is open. Note: the access valve 28 and the transfer valve 30 cannot be open at the same time.

Still referring to FIG. 1 it will be seen that the electro-magnetic subsystem 12 includes a linear generator 32 which is vertically oriented above the lower transfer tank 24. With the linear generator 32 so oriented, a shuttle 34 can be dropped from a launch point 36 under the influence of gravity for engagement with the linear generator 32. It is during its engagement with the linear generator 32, while the shuttle 34 is maintained at a constant velocity $v_e$, that the kinetic energy of the falling shuttle 34 is converted into electricity for the output power 18 of the power plant 10.

As shown in FIG. 1, upon disengagement from the linear generator 32 the shuttle 34 will pass through an opened access valve 28 and dive into the bi-level tank 22 through a water surface at a lower level 38. After decelerating in the bi-level tank 22, the shuttle 34 rises under the influence of its buoyancy and then breaches from the bi-level tank 22 through a water surface at an upper level 40.

The hydro-pneumatic subsystem 14 of the power plant 10 includes an air compressor 42 which is continuously operated to maintain air pressure in a compressed air receiver tank 44. Specifically, air pressure in the receiver tank 44 is maintained at a level equal to H± where H represents the head height of water pressure in the upper tower tank 26 of the electro-magnetic subsystem 12. The hydro-pneumatic subsystem 14 also includes an air chamber 46 that is separated from the receiver tank 44 by a burst valve 48. As shown, the air chamber 46 extends from the burst valve 48 to a piston plate 50 which is located in the lower transfer tank 24 of the bi-level tank 22. Inside the lower transfer tank 24 a collapsible bellows 52 is connected to the piston plate 50 and extends therefrom to the edge of the lower transfer tank 24 to surround a portion of the air chamber 46. It is the bellows 52 that allows the piston plate 50 to reciprocally move up and down in the lower transfer tank 24.

FIG. 1 further shows that included with the air chamber 46 is a pressure valve 54 and an exhaust valve 56. These valves 54/56 cooperate in combination with each other to alternately establish fluid communication between the piston plate 50 and the burst valve 48 via pressure valve 54, or between the piston plate 50 and the atmosphere via exhaust valve 56. A flexible skirt 58 is connected to the piston plate 50 and extends therefrom in a direction opposite and away from the bellows 52 for connection with a side of the lower transfer tank 24. Thus, a constant volume of water is created within the skirt 58 between the piston plate 50 and the side of the lower transfer tank 24. The water volume that is surrounded by the flexible skirt 58 is maintained at a pressure that is equal to the head height H of the upper tower tank 26. Further, the flexibility of the skirt 58 allows the water that is surrounded by the skirt 58 to maintain a constant volume while it changes shape as the piston plate 50 is moved up and down under the influence of compressed air in the air chamber 46.

Figure 2:
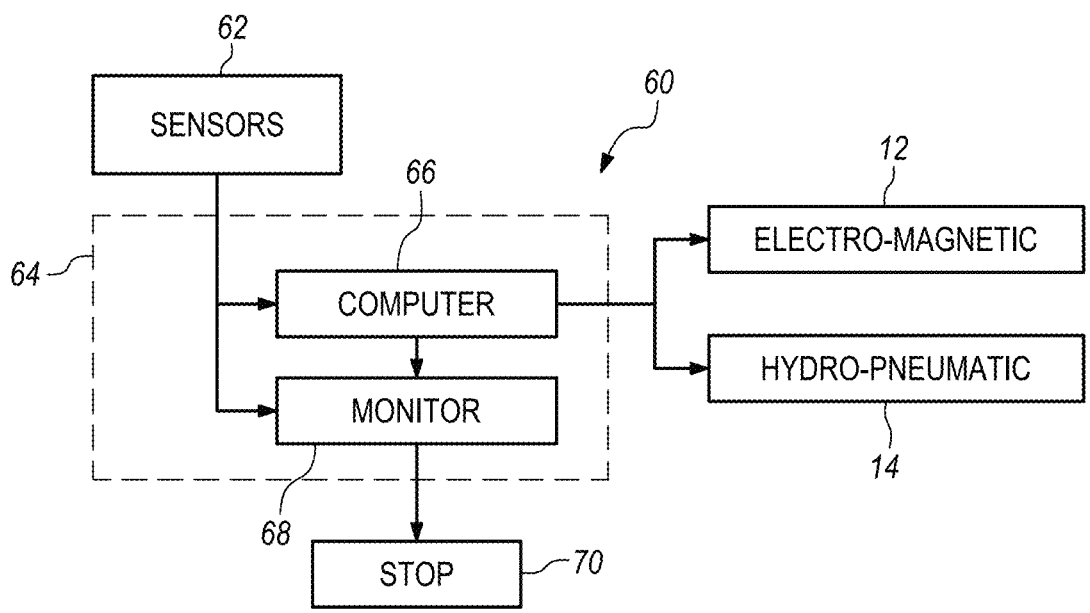
FIG. 2 is a schematic drawing of a control unit for use in controlling the operation of the machine.

Referring to FIG. 2, a control system for the power plant 10 of the present invention is shown and is generally designated 60. As shown, the control system 60 includes a plurality of sensors 62 that are selectively located throughout the power plant (machine) 10. Specifically, depending on their location in the machine 10, the sensors 62 will include either velocity or pressure sensors. For purposes of controlling an operation of the power plant (machine) 10, all the sensors 62 are respectively connected directly to a control unit 64 which, in turn, is operationally connected with both the electro-magnetic subsystem 12 and the hydro-pneumatic subsystem 14. The sensors 62 are also connected to a monitor 68 that provides an automatic stop function 70 in the event any of the sensors 62 indicate an operational impasse.

Figure 3:
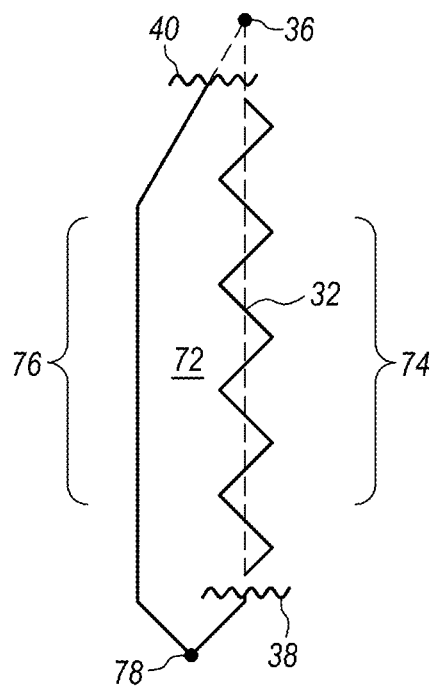
FIG. 3 is a graphical presentation of the closed-loop pathway followed by a buoyant shuttle during a complete operational circuit of the shuttle through the machine.

In FIG. 3 a closed-loop pathway on which the shuttle 34 travels through the machine 10 for a complete operational circuit is shown and is generally designated 72. As shown, the closed-loop pathway 72 includes an airway portion 74 and a contiguous waterway portion 76. Also shown in FIG. 3 is launch point 36 for the shuttle 34 on the airway portion 74 at the top of the closed-loop pathway 72, and a turn-around point 78 submerged in the waterway portion 76 at the bottom of the closed-loop pathway 72. It is noteworthy that the velocity of the shuttle 34 will be momentarily equal to zero at both the launch point 36 and at the turnaround point 78. Thus, for disclosure purposes a complete operational circuit can be considered as starting and ending at the launch point 36.

In detail, the airway portion 74 of the closed-loop pathway 72 extends from the water surface of the upper level 40 in the bi-level tank 22 where the shuttle 34 breaches and comes to rest at the launch point 36. The airway portion 74 then continues downward along the linear generator 32 where the shuttle 34 falls under the influence of gravity. The airway portion 74 then ends after the shuttle 34 disengages from the linear generator 32 and dives through the water surface at the lower level 38 in the bi-level tank 22. The waterway portion 76 of the closed-loop pathway 72 then starts at the lower level 38 and continues downward to the turnaround point 78 at the bottom of the bi-level tank 22. From the turnaround point 78 the waterway portion 76 extends upward through the upper tower tank 26 of the bi-level tank 22 to the water surface at the upper level 40.

Figure 4A:
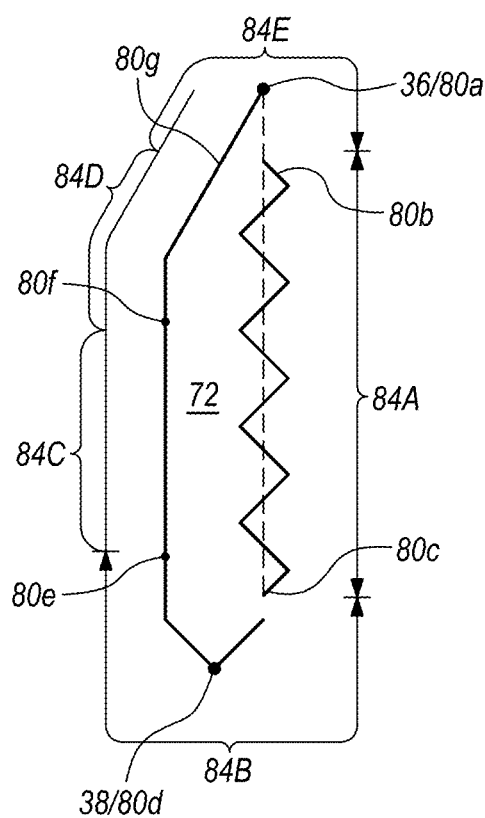
FIG. 4A is a time graph showing a plurality of consecutive equal time zones relative to the closed-loop pathway, wherein each time zone is sequentially and simultaneously occupied by consecutive shuttles during an operation of the machine.

Control over an operation of the power plant (machine) 10 during a complete operational circuit of the shuttle 34 is primarily a matter of time control and pressure monitoring. Accordingly, FIG. 4A shows that a plurality of velocity sensors 80a-g are selectively positioned along the closed-loop pathway 72. Also, as shown in FIG. 1, a plurality of pressure sensors 82a-c are positioned in the machine 10.

In detail, FIG. 4A shows the positioning of a velocity sensor 80a at the launch point 36. A velocity sensor 80b is also shown at the top of the linear generator 32 and a velocity sensor 80c is shown at the bottom of the linear generator 32. A velocity sensor 80d is located at the turnaround point 78 and a series of velocity sensors 80e-g are aligned along the closed-loop pathway 72 between the turnaround point 78 and the launch point 36. As intended for the present invention, the velocity sensors 80a-g are each connected as input to the computer 66 for collective use in coordinating operations of the valves 28/30 in the bi-level tank 22, operations of the valves 54/56 in the air chamber 46, and an operation of the burst valve 48 of the receiver tank 44.

In addition to the velocity sensors 80a-g, a pressure sensor 82a is positioned to monitor the compressed air pressure H± in the receiver tank 44. Further, a pressure sensor 82b is positioned to monitor air pressure changes in the air chamber 46 and, a pressure sensor 82c is positioned to monitor water pressure changes in the lower transfer tank 24. As intended for the present invention the pressure sensors 82a-c are connected to the monitor 68 to ensure proper operating pressures in the receiver tank 44, in the air chamber 46 and in the lower transfer tank 24. Moreover, in the event of any impermissible deviation from predetermined operating ranges of the afore-mentioned pressures will indicate a stop function 70. Likewise, deviations in velocity or location information of the shuttle 34 will indicate a stop function 70.

Still referring to FIG. 4A it will be seen that, for operational control purposes, the closed-loop pathway 72 for a shuttle 34 can be divided into a series of time zones 84A-E. Each time zone 84A-E will have the same time duration. Depending on the velocity and any required changes in the velocity of a shuttle 34 within a particular time zone 84, the physical length of the time zone 84 will vary. Thus, for control purposes, the start time of each time zone 84 is predetermined. Recall, the time zones 84A-E are contiguous. In detail, the start time for time zone 84A is set by the velocity sensor 80b which is located at the beginning of the linear generator 32. Time zone 84A then ends, and the time zone 84B begins, with the velocity sensor 80c at the lower end of the linear generator 32. Time zone 84B then ends, and the time zone 84C begins, with the velocity sensor 80e which is in the upper tower tank 26 where the shuttle 34 will be above the transfer valve 30. Time zone 84C then ends, and the time zone 84D begins, with the velocity sensor 80f while the shuttle 34 is rising at its terminal velocity $v_t$ in the tower tank 26. Time zone 84D then ends, and the time zone 84E begins, with the velocity sensor 80g which is located in the upper tower tank 26 before the shuttle breaches and enters the airway portion 74 of the closed-loop pathway 72. As disclosed in detail with reference to FIG. 4B, an important control consideration for the control unit 64 is the stay (reset) time $t_s$ required to launch the shuttle 34 from the launch point 36.

Figure 4B:
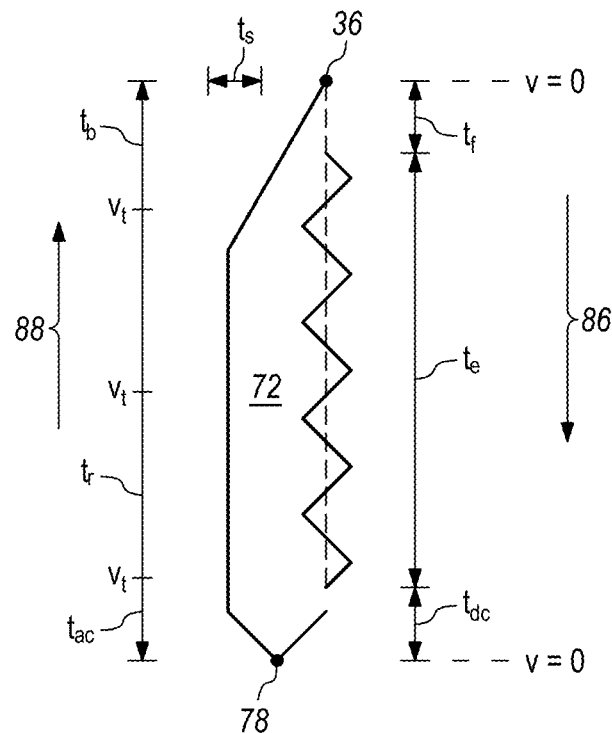
FIG. 4B is a time graph showing velocities for each shuttle as it transits through an operational circuit between an upper launch point of zero velocity and a lower turn-around point of zero velocity on the closed-loop pathway.

Referring to FIG. 4B, time segments in the operational circuit are presented relative to the velocities v of the shuttle 34. Specifically, the vertical oriented timeline 86 depicted in FIG. 4B identifies time segments during a descent of the shuttle 34 from v=0 at the launch point 36 to v=0 at the turnaround point 78. These time segments include, a free fall time $t_f$ which is needed for the shuttle 34 to accelerate to a predetermined engagement velocity $v_e$ which is established for an engagement of the shuttle 34 with the linear generator 32. As noted elsewhere in this disclosure, the engagement time $t_e$ between the shuttle 34 and the linear generator 32 is a critical design feature of the machine 10. The time segment $t_{dc}$ at the bottom of timeline 86 is a descent time for decelerating the shuttle 34 to v=0 after it disengages from the linear generator 32 and dives into the lower transfer tank 24.

The vertical oriented timeline 88 in FIG. 4B depicts time segments for velocities of the shuttle 34 as it accelerates from v=0 at the turnaround point 78 and rises through the upper tower tank 26 to the launch point 36. These time segments of the timeline 88 include an acceleration time $t_{ac}$ wherein the shuttle 34 accelerates to a terminal velocity $v_t$ in the upper tower tank 26. Thereafter, the shuttle essentially maintains its terminal velocity $v_t$ until it breaches tb. FIG. 4B also shows a stay time duration $t_s$ while the shuttle 34 remains at v=0 on the launch point 36. As intended for the present invention, the stay time $t_s$ is used by the computer 66 to adjust the duration of time zone 84E (±) to reconcile unintended velocity deviations encountered by the shuttle 34 during a complete operational circuit.

Figure 5:
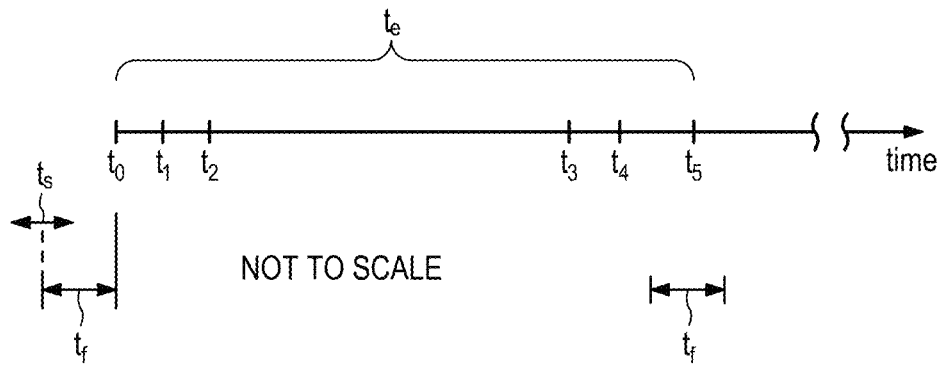
FIG. 5 is a timeline graph showing the temporal relations between valve configurations that are coordinated by the control unit during a shuttle duty cycle, for concerted operations of the machine's subsystems.
Figure 6:
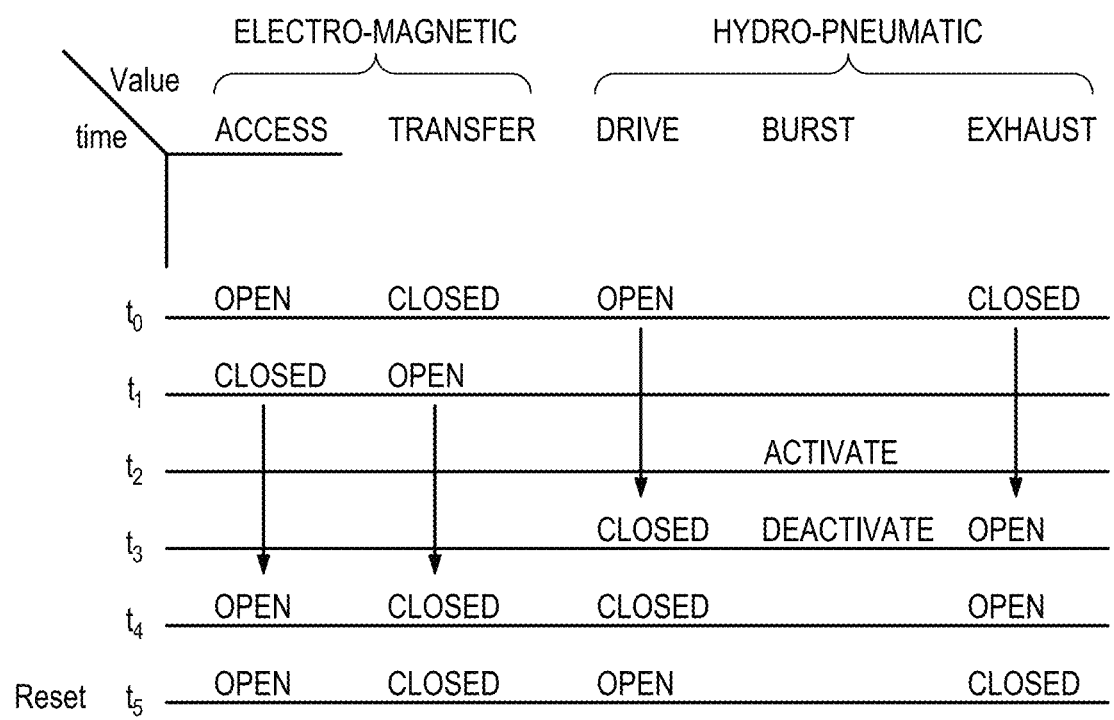
FIG. 6 is a table identifying the valve configurations of respective valve systems at a same selected time during a shuttle duty cycle on the timeline graph shown in FIG. 5.

By cross referencing FIG. 5 and FIG. 6, the engagement time $t_e$ of the shuttle 34 with the linear generator 32 (FIG. 5) is used as an operational timeframe. With reference to the timeframe $t_e$ (FIG. 5) the cooperative interaction of the valving mechanisms of the electro-magnetic subsystem 12 with the hydro-pneumatic subsystem 14 of the power plant 10 can be appreciated.

At the beginning of the operational timeframe to the access valve 28 of the lower transfer tank 24 is open to receive a shuttle 34 into the lower transfer tank 24, after it disengages from the linear generator 32. Also, at the time to, in the hydro-pneumatic subsystem 14 the burst valve 48 from the receiver tank 44 has been deactivated while the pressure valve 54 in the air chamber 46 is open and the exhaust valve 56 is closed.

At the time $t_1$, after the shuttle has entered the lower transfer tank 24, the access valve 28 is closed. The transfer valve 30 is simultaneously opened to provide for an unobstructed transit of the shuttle 34 from the lower transfer tank 24 and into the upper tower tank 26. At the time $t_2$, the burst valve 48 has been activated to move the piston plate 50 upwardly into the lower transfer tank 24. The consequence here is to thereby displace water from the lower transfer tank 24 and into the upper tower tank 26. At the time $t_3$, after the shuttle 34 has transited from the lower transfer tank 24 and into the upper tower tank 26 the burst valve 48 can be deactivated. Also, at the time $t_3$ the pressure valve 54 can be closed in the air chamber 46 and the exhaust valve 56 can be opened to exhaust compressed air between the piston plate 50 and the pressure valve 54 from the air chamber 46 and into the atmosphere.

Between the times $t_3$ and $t_4$, after compressed air has been exhausted from the air chamber 46 and the burst valve 48 has been deactivated, the pressure valve 54 in the air chamber 46 can be opened and the exhaust valve 56 closed. Then, between the times $t_4$ and $t_5$, after the computer 66 has adjusted time zone E for the necessary stay (reset) time $t_s$, the machine 10 is reset and properly configured for the next complete operational circuit of a shuttle 34.

While the particular invention as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A control system for operating a machine to generate electric power with kinetic energy harvested from a buoyant shuttle as the shuttle falls through air while engaged with a linear generator, which comprises:

a plurality of motion sensors respectively mounted at predetermined locations on the machine to track the shuttle during its transit along a vertically oriented closed-loop pathway defined by a bi-level tank, wherein the bi-level tank has an upper water surface and a lower water surface with both located on the closed-loop pathway;

a first valve system mounted on the bi-level tank for maintaining the upper water surface above the lower water surface, to establish the closed-loop pathway with an airway portion outside the bi-level tank and a waterway portion inside the bi-level tank;

a second valve system for controlling the operation of a piston plate submerged in the bi-level tank, wherein the second valve system activates the piston plate to move a predetermined volume of water up and down along the waterway portion of the closed-loop pathway in the bi-level tank, to compensate for the transit of the buoyant shuttle along the waterway portion of the closed-loop pathway; and a control unit connected respectively with the plurality of sensors, with the first valve system, and with the second valve system to maintain a continuity for shuttle transit along the closed-loop pathway, and to coordinate the up and down movement of water along the waterway in the bi-level tank with the entry of the shuttle onto the waterway and its exit from the waterway during a predetermined time duration $\Delta t$.

2. The control system of claim 1 wherein the closed-loop pathway comprises:
a plurality of consecutive time zones, wherein each time zone has a same time duration $\Delta t$; and
at least one motion sensor is positioned in each time zone, with the motion sensor being located at the beginning of the time zone.

3. The control system of claim 2 further comprising:
a computer included in the control unit; and
a timer connected with the computer for use by the computer in monitoring input from the motion sensors to determine the location and velocity of the shuttle during its transit of the closed-loop pathway.

4. The control system of claim 2 wherein the second valve system is incorporated into a hydro-pneumatic subsystem of the machine, and the hydro-pneumatic subsystem comprises:
a receiver tank;
an air compressor connected with the receiver tank to maintain a predetermined compressed air pressure in the receiver tank; and
a compressed air chamber interconnecting the receiver tank in fluid communication with the piston plate for activating the piston plate for moving the predetermined volume of water up and down during each time duration $\Delta t$.

5. The control system of claim 4 wherein the predetermined volume of water and the volume of shuttle are equal.

6. The control system of claim 2 wherein there are five consecutive time zones along the closed-loop pathway, and each time zone is respectively identified individually as a sequential zone A-E, and wherein each time zone has at least one time segment and wherein the shuttle will have a characteristic velocity value, v, within the time segment.

7. The control system of claim 6 wherein:
time zone A identifies a time of engagement, $t_e$, between the falling shuttle and the linear generator, and wherein the shuttle has a constant engagement velocity, $v_e$, during a $\Delta t$;
time zone B identifies velocity changes for the shuttle as the shuttle droops into the bi-level tank for continued transit on the underwater portion of the closed-loop pathway;
time zones C and D identify a rise time, $t_r$, at a same terminal velocity, $v_r$, for the shuttle during a respective $\Delta t$; and
time zone E identifies a transition time and velocity changes therein for the shuttle as the shuttle moves from the waterway portion of the closed-loop pathway to the airway portion of the closed-loop pathway, during a $\Delta t$.

8. The control system of claim 7 wherein time zone B comprises:
a deceleration time segment, $t_{dc}$, wherein the shuttle velocity decreases from $v_e$ to v=0 in the bi-level tank after the shuttle disengages from the linear generator; and
an acceleration time segment, $t_{ac}$, wherein the shuttle velocity increases from v=0 to a terminal velocity, $v_r$, for its ascent on the waterway portion of the closed-loop pathway prior to a shuttle breach from the bi-level tank.

9. The control system of claim 7 wherein time zone E comprises:
a breaching time segment, $t_b$, wherein the shuttle maintains $v_t$ until shuttle breach when v=0;
a stay time, $t_s$, immediately following $t_b$, wherein the shuttle velocity remains zero until a release of the shuttle will fulfill $\Delta t$; and
a free fall time, $t_f$, as the shuttle accelerates from v=0 to $v_e$ after its release for engagement with the linear generator.

10. The control system of claim 1 wherein $\Delta t$ is established to satisfy the power requirements of the machine where the output power, $P_o$, harvested from the kinetic energy of the shuttle by the linear generator during $\Delta t$ is greater than the input power, $P_i$, required to overcome the potential energy needed to lift water in the bi-level tank for operating the machine.

11. A machine for generating electric power with kinetic energy harvested from a buoyant shuttle as the shuttle falls through air under the influence of gravity, which comprises:
a bi-level tank defining a vertically oriented closed-loop pathway, wherein the bi-level tank has an upper water surface and a lower water surface which are respectively located on the closed-loop pathway with a predetermined vertical separation therebetween to establish the closed-loop pathway with an airway portion outside the bi-level tank and with a waterway portion inside the bi-level tank;
an electro-magnetic subsystem including a linear generator, wherein the linear generator is vertically aligned along the airway portion of the closed-loop pathway for engagement with the shuttle to harvest the kinetic energy of the shuttle as it falls along the airway portion of the closed-loop pathway;
a hydro-pneumatic subsystem including a displacement device, wherein the displacement device is submerged in the bi-level tank and is activated to compensate for a transit of the buoyant shuttle along the waterway portion of the closed loop pathway by overcoming the potential energy needed to periodically move a predetermined volume of water upwardly along the waterway portion of the closed loop pathway in the bi-level tank;
a plurality of motion sensors respectively mounted at predetermined locations on the machine to track the buoyant shuttle during its transit along the closed loop pathway; and a control unit connected with the plurality of sensors in the electro-magnetic subsystem to coordinate the up and down movement of water along the waterway in the bi-level tank driven be the hydro-pneumatic subsystem to accommodate the entry of the shuttle onto the waterway portion and its exit from the waterway portion of the closed-loop pathway.

12. The machine of claim 11 wherein the closed-loop pathway comprises:
 a plurality of five consecutive time zones aligned along the closed-loop pathway, wherein each time zone is sequentially identified as a zone A-E, and wherein each time zone includes at least one time segment with a characteristic shuttle velocity value, v, and further wherein each time zone has a same time duration $\Delta t$ with a motion sensor located at the beginning of the time zone;
 a computer included in the control unit; and
 a timer connected with the computer for use by the computer in monitoring input from the motion sensors to determine the location and velocity of the shuttle during its transit along the closed-loop pathway.

13. The machine of claim 12 wherein the hydro-pneumatic subsystem of the machine further comprises:
 a piston plate submerged in the bi-level tank, wherein the piston plate has an upper surface and an underside, wherein the upper surface is in fluid contact with water in the bi-level tank
 a receiver tank;
 an air compressor connected with the receiver tank to maintain a predetermined compressed air pressure in the receiver tank; and
 a compressed air chamber interconnecting the receiver tank in fluid communication with an underside surface of the piston plate for activating the piston plate to move the predetermined volume of water upwardly in the bi-level tank during each time duration $\Delta t$, and for exhausting air from the air chamber at the end of the time duration $\Delta t$.

14. The machine of claim 12 wherein:
 time zone A identifies a time of engagement, $t_e$, between the falling shuttle and the linear generator, and wherein the shuttle has a constant engagement velocity, $v_e$, during a time duration $\Delta t$;
 time zone B identifies a transition time with velocity changes for the shuttle as the shuttle moves from the airway portion of the closed-loop pathway to the waterway portion of the closed-loop pathway, during $\Delta t$;
 time zones C and D identify a rise time, $t_r$, at a same terminal velocity, $v_t$, for the shuttle during a respective $\Delta t$; and
 time zone E identifies a transition time with velocity changes therein for the shuttle as the shuttle moves from the waterway portion of the closed-loop pathway to the airway portion of the closed-loop pathway, during $\Delta t$.

15. The machine of claim 14 wherein time zone B comprises:
 a deceleration time segment, $t_{dc}$, wherein the shuttle velocity decreases from $v_e$ to v=0 in the bi-level tank after the shuttle disengages from the linear generator; and an acceleration time segment, $t_{ac}$, wherein the shuttle velocity increases from v=0 to a terminal velocity, $v_t$, for its ascent on the waterway portion of the closed-loop pathway prior to a shuttle breach from the bi-level tank.

16. The machine of claim 14 wherein time zone E comprises:
 a breaching time segment, $t_b$, wherein the shuttle maintains $v_t$ until shuttle breach when v=0;
 a variable stay time, $t_s$, immediately following $t_b$, wherein the shuttle is held stationary with a zero velocity until a release of the shuttle will fulfill $\Delta t$; and
 a free fall time, $t_f$, as the shuttle accelerates from v=0 to $v_e$ after its release for engagement with the linear generator.

17. The machine of claim 12 wherein $\Delta t$ is established to satisfy the power requirements of the machine wherein an output power, $P_o$, harvested from the kinetic energy of the shuttle by the linear generator during $\Delta t$ is greater than the input power, $P_i$, required to overcome the potential energy needed to lift water in the bi-level tank for operating the machine.

18. A method for operating a machine to generate electric power using kinetic energy harvested from a buoyant shuttle as the shuttle falls during its engagement with a linear generator, which comprises:
 positioning a plurality of sensors at predetermined locations on the machine to track the buoyant shuttle during its transit along a vertically oriented closed-loop pathway defined by a bi-level tank, wherein the bi-level tank has an upper water surface and a lower water surface located on the closed loop pathway:
 operating a hydrodynamic valve system mounted on the bi-level tank to maintain the upper water surface above the lower water surface, to establish the closed-loop pathway with an airway portion outside the bi-level tank and with a waterway portion inside the bi-level tank;
 activating a pneumatic valve system for controlling the operation of a piston plate submerged in the bi-level tank to move a predetermined volume of water up and down along the waterway portion of the closed loop pathway in the bi-level tank, to compensate for the transit of the buoyant shuttle along the waterway portion of the closed loop pathway; and
 controlling the operating step and the activating step with a control unit connected respectively with the plurality of sensors, to coordinate the up and down movement of water along the waterway in the bi-level tank, with the entry of the shuttle onto the waterway and its exit from the waterway.

19. The method of claim 18 wherein the activating step is accomplished using compressed air with the pneumatic system, and the method further comprises the steps of:
 placing pressure sensors at selected locations on the machine; and
 monitoring the pressure sensors to control an operation of the machine.

20. The method of claim 19 further comprising the step of selectively stopping the machine for a periodic maintenance requirement.

* * * * *